United States Patent [19]
Rockower et al.

[11] Patent Number: 5,306,101
[45] Date of Patent: Apr. 26, 1994

[54] CUTTING/EXPANDING TOOL

[75] Inventors: Gerald Rockower, Brooklyn, N.Y.; Joseph J. Marazzo, Scotch Plaines, N.J.

[73] Assignee: Brooklyn Union Gas, Brooklyn, N.Y.

[21] Appl. No.: 989,563

[22] Filed: Dec. 11, 1992

Related U.S. Application Data

[63] Continuation-in-part of Ser. No. 854,578, Mar. 20, 1992, Pat. No. 5,171,106, which is a continuation-in-part of Ser. No. 636,258, Dec. 31, 1990, Pat. No. 5,098,225.

[51] Int. Cl.$^5$ .................... F16L 1/00; F16L 55/18
[52] U.S. Cl. .................... 405/154; 30/92.5; 166/55.3; 166/55.7; 405/156; 405/184
[58] Field of Search .......... 405/154, 156, 184; 30/92.5; 166/55.2, 55.3, 55.7; 138/97; 29/890.031, 426.1, 426.5

[56] References Cited

U.S. PATENT DOCUMENTS

| | | | |
|---|---|---|---|
| 2,983,042 | 5/1961 | Frantz et al. | 29/890.031 X |
| 3,181,302 | 5/1965 | Lindsay | 405/156 |
| 4,648,746 | 3/1987 | Abinett | 405/154 X |
| 4,674,914 | 6/1987 | Wayman et al. | 405/154 |
| 4,903,406 | 2/1990 | Schosek et al. | 405/156 X |
| 4,983,071 | 1/1991 | Fisk et al. | 405/154 |

*Primary Examiner*—Dennis L. Taylor
*Attorney, Agent, or Firm*—Fitzpatrick, Cella, Harper & Scinto

[57] ABSTRACT

A cutting/expanding tool includes a cylindrical support body having a guide side and a cutting side, a pair of guide rollers mounted in tandem along the longitudinal axis of the support body on the guide side, a cutting wheel mounted between the tandem guide rollers on the cutting side of the support body, and an expander connected rearwardly of the support body. A plurality of cutting wheels may also be provided, each of progressively increasing diameter. A scoring wheel may be mounted forwardly of the cutting wheels to prescore the surface to be cut, so as to facilitate the cutting action, and a deburrer may be mounted rearwardly of all the cutting wheels so as to smooth the cut edge. A method of using the cutting/expanding tool is also described, whereby after the tool has been propelled through a buried main to cut and to expand it, a replacement main is drawn back through the existing main. A conical, wedge or pie shaped expander may be used.

8 Claims, 12 Drawing Sheets

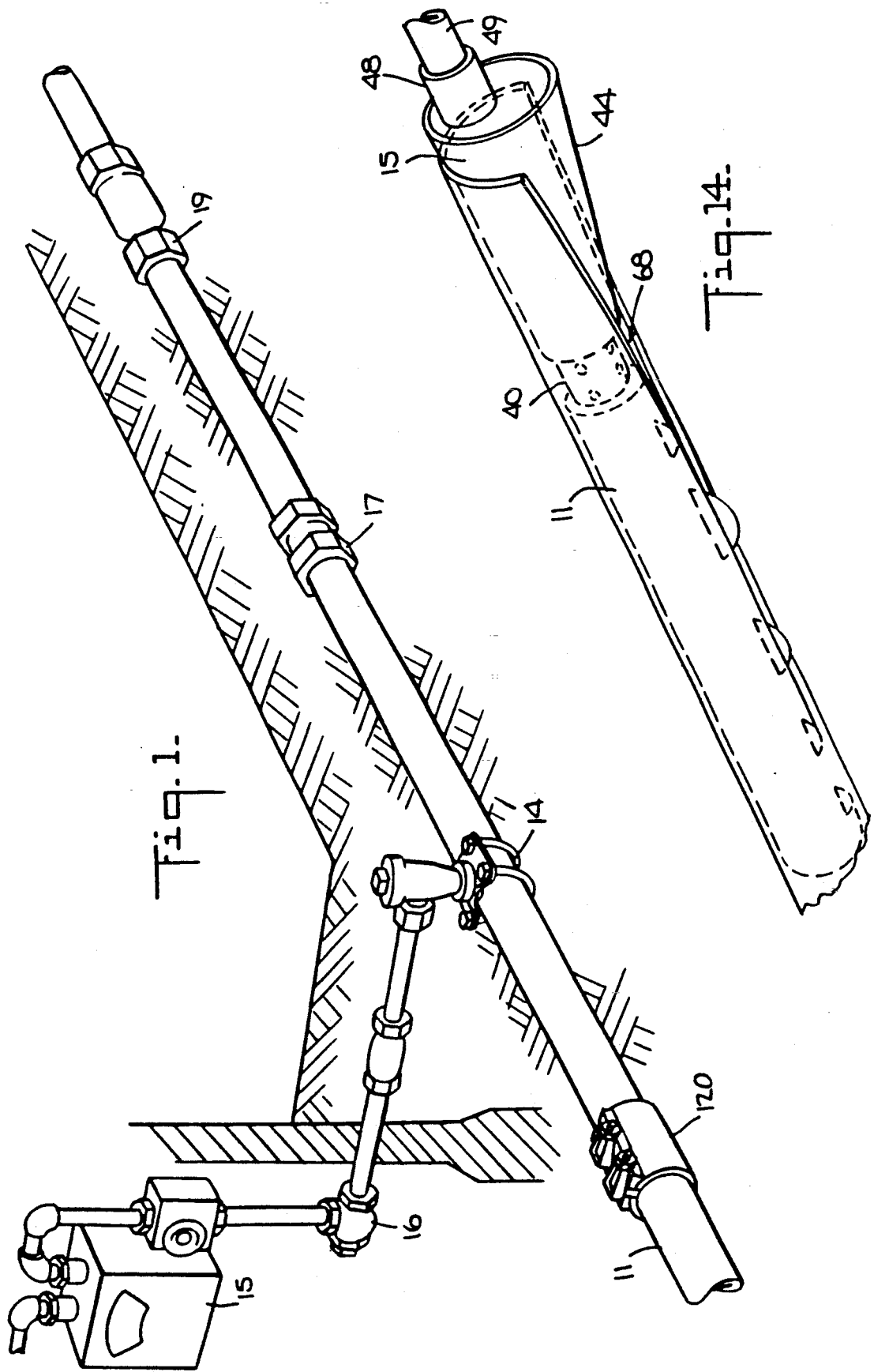

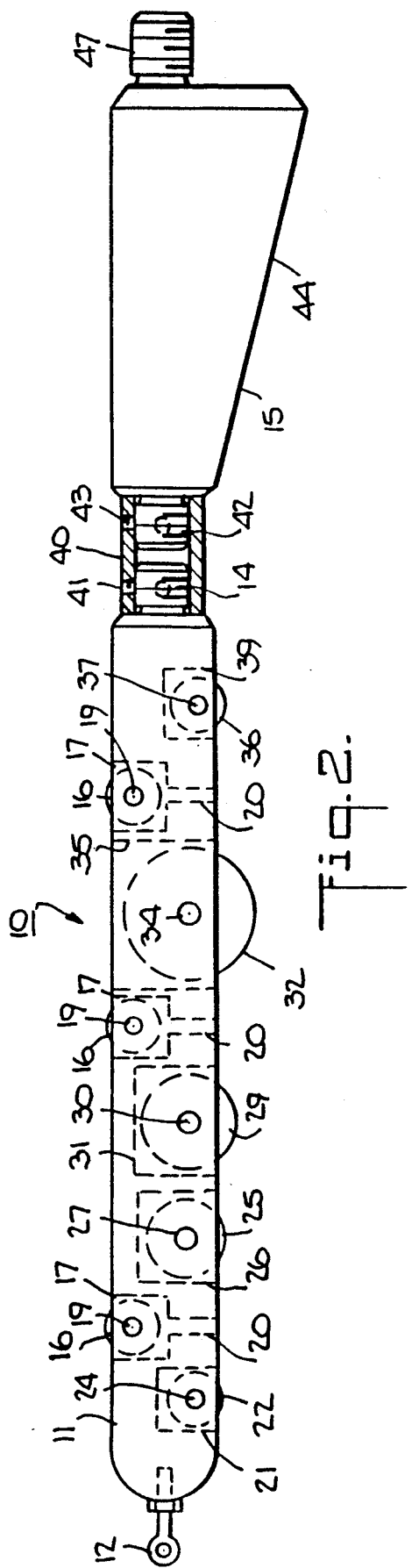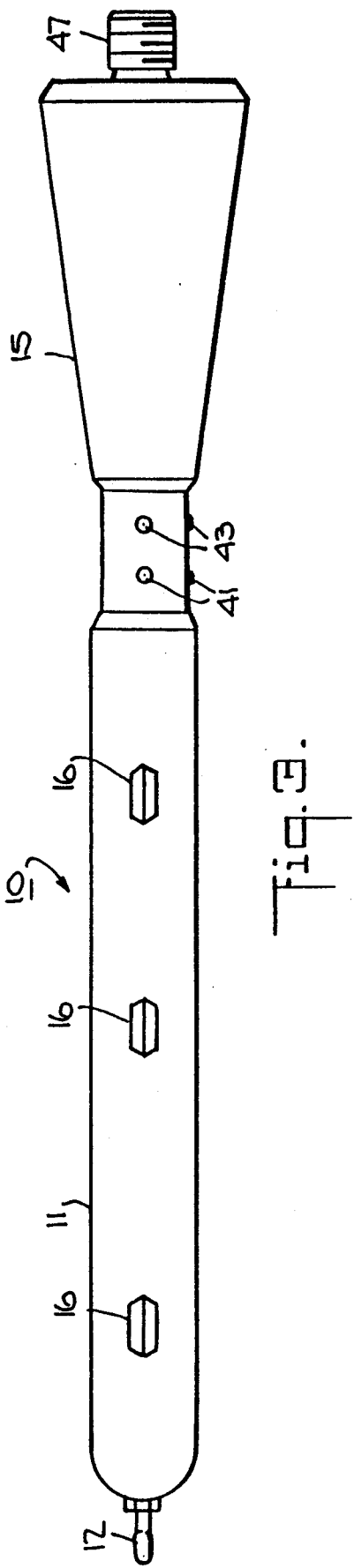

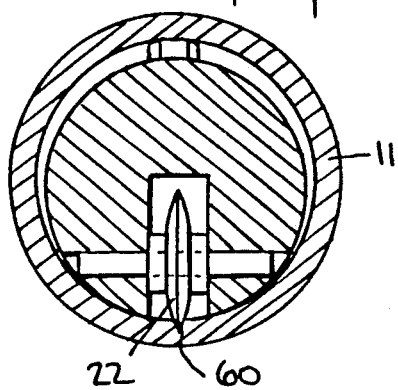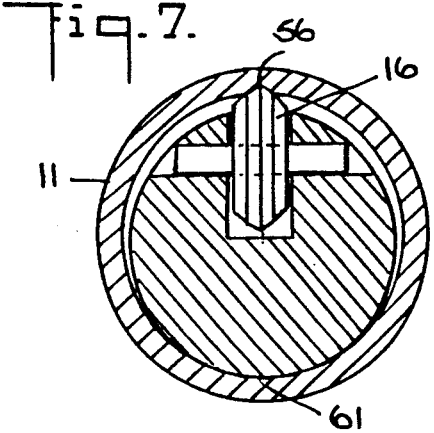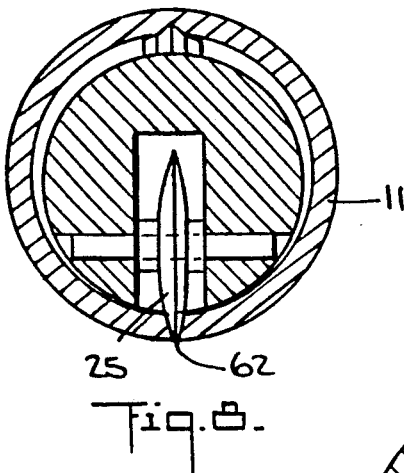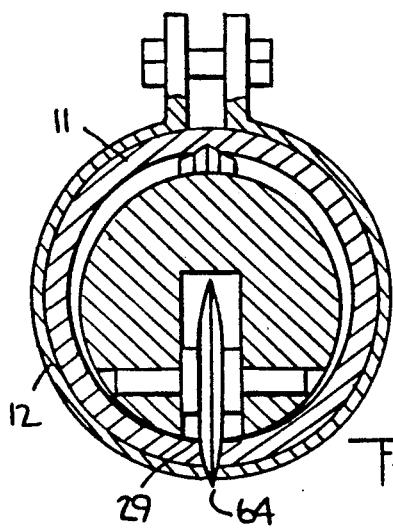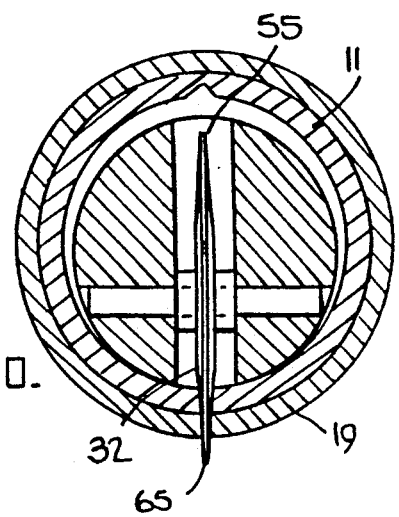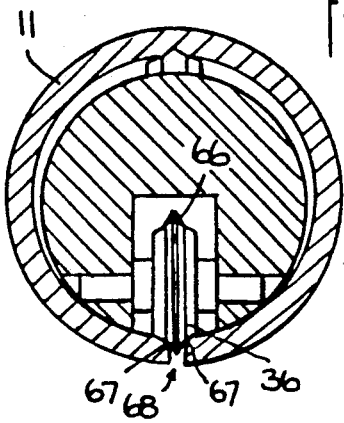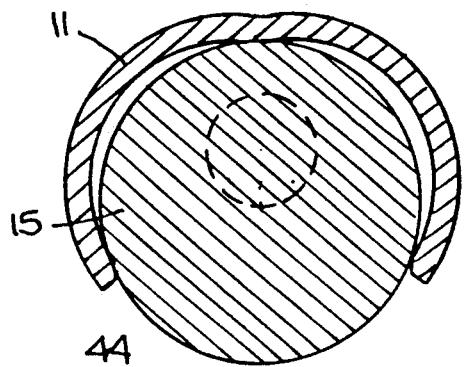

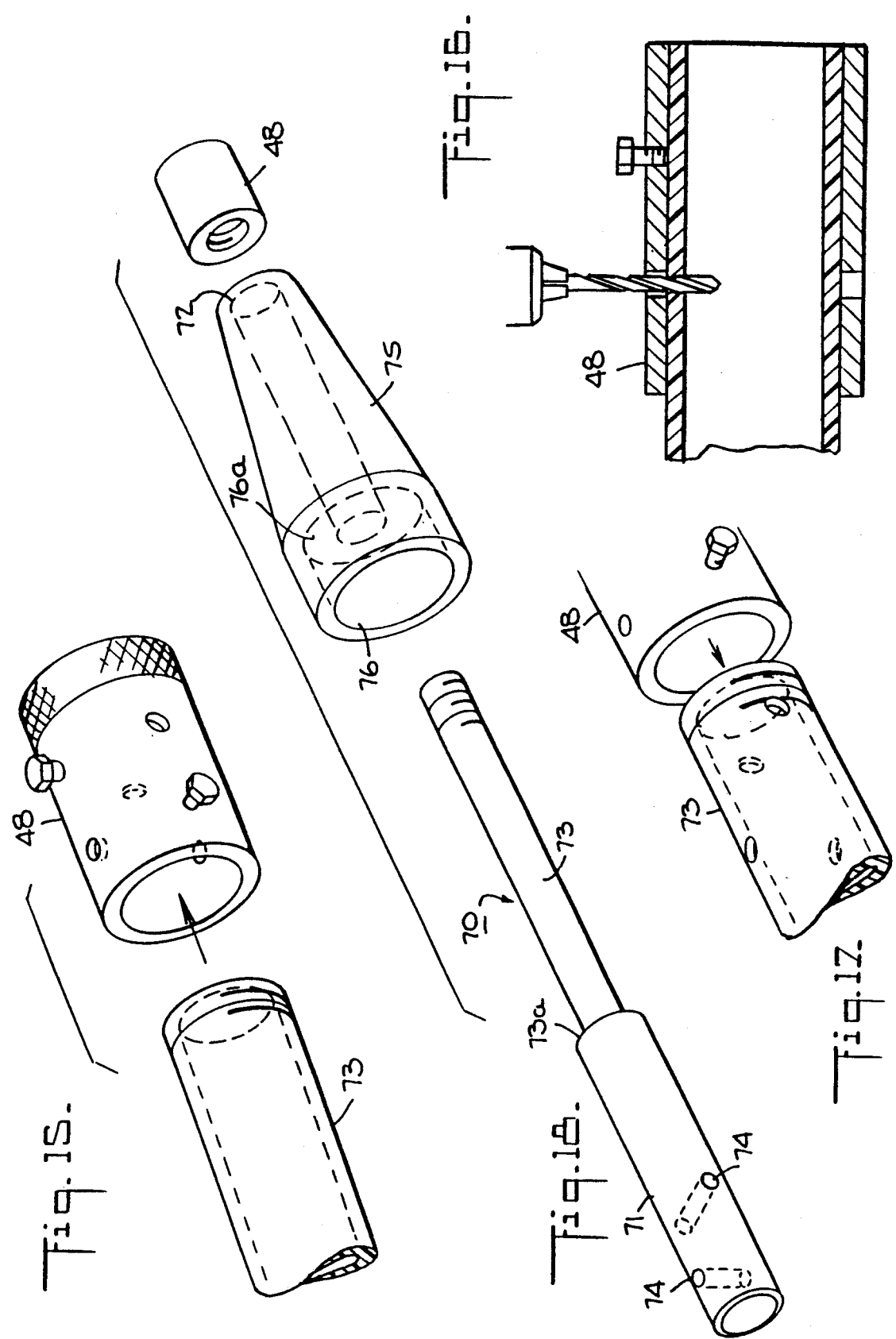

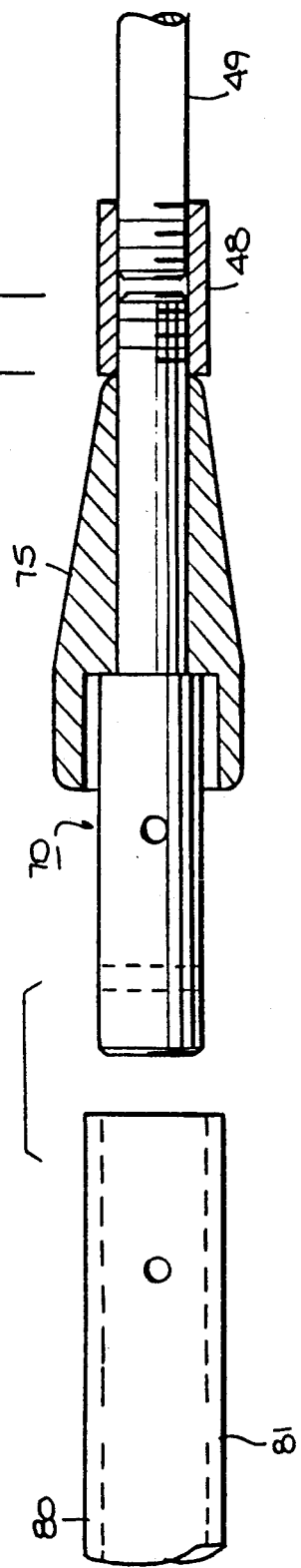
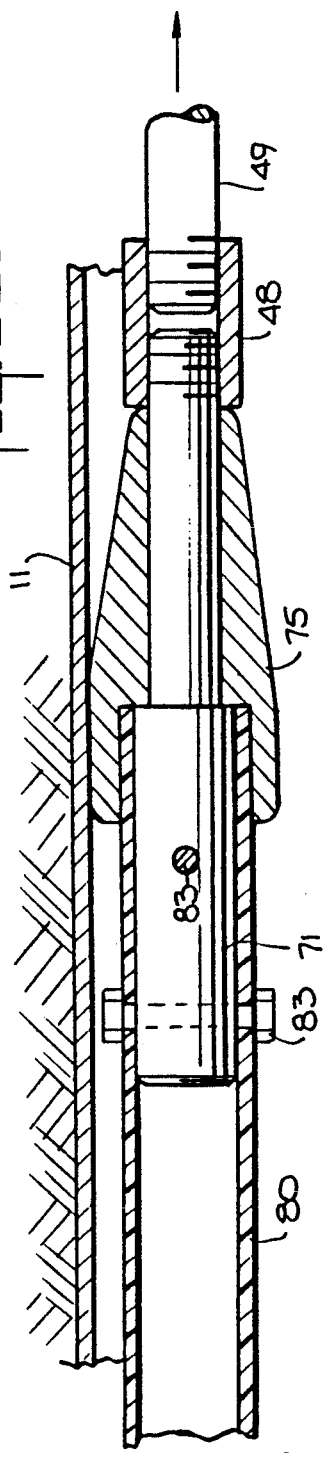
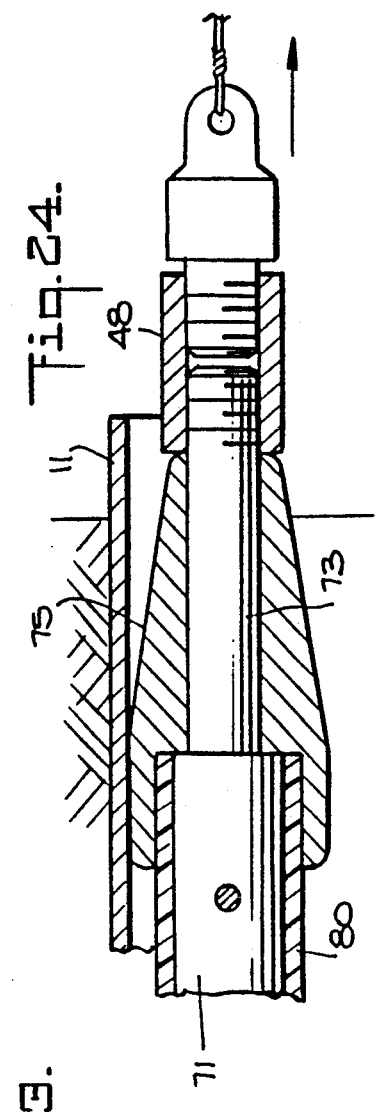
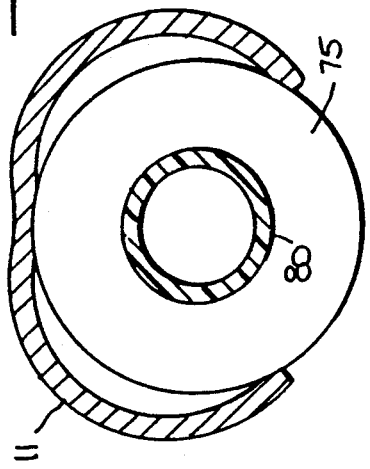

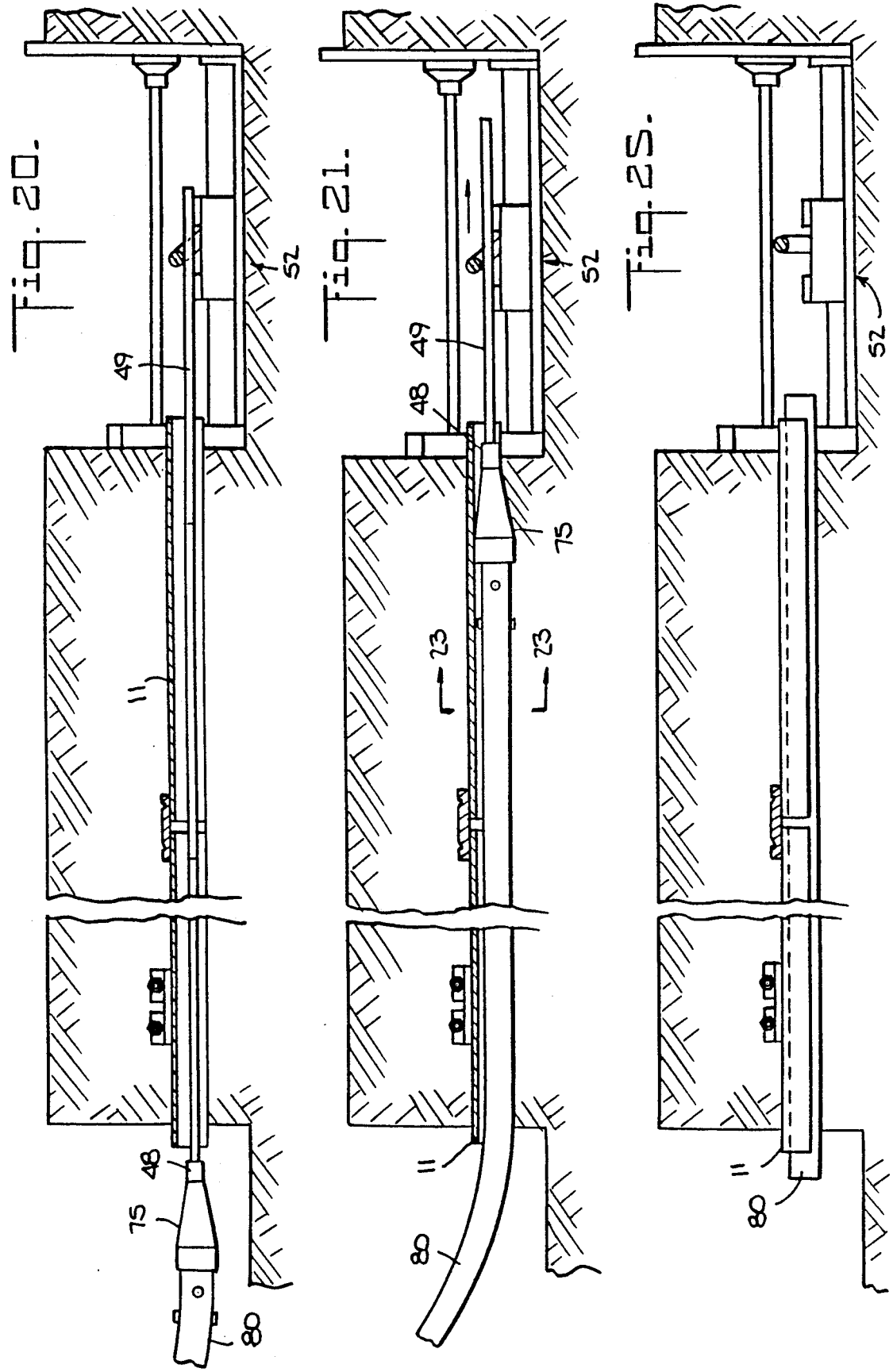

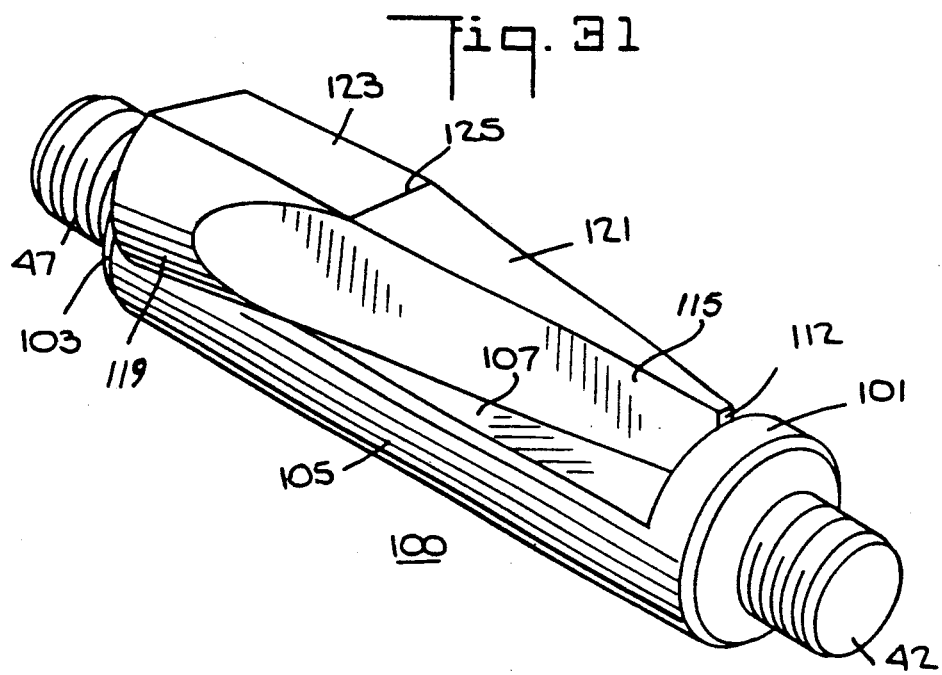
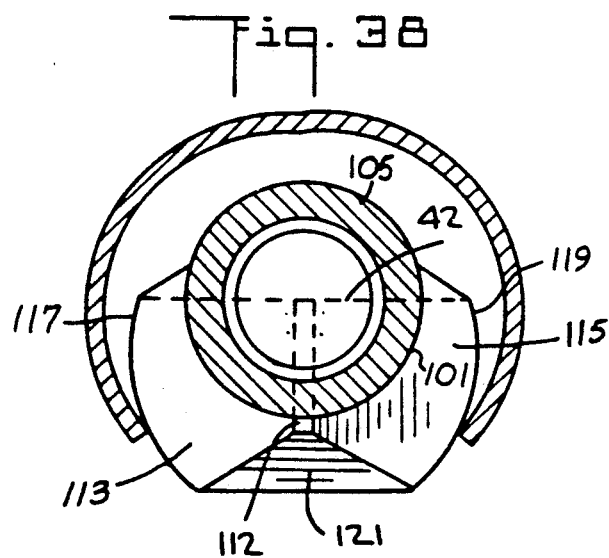

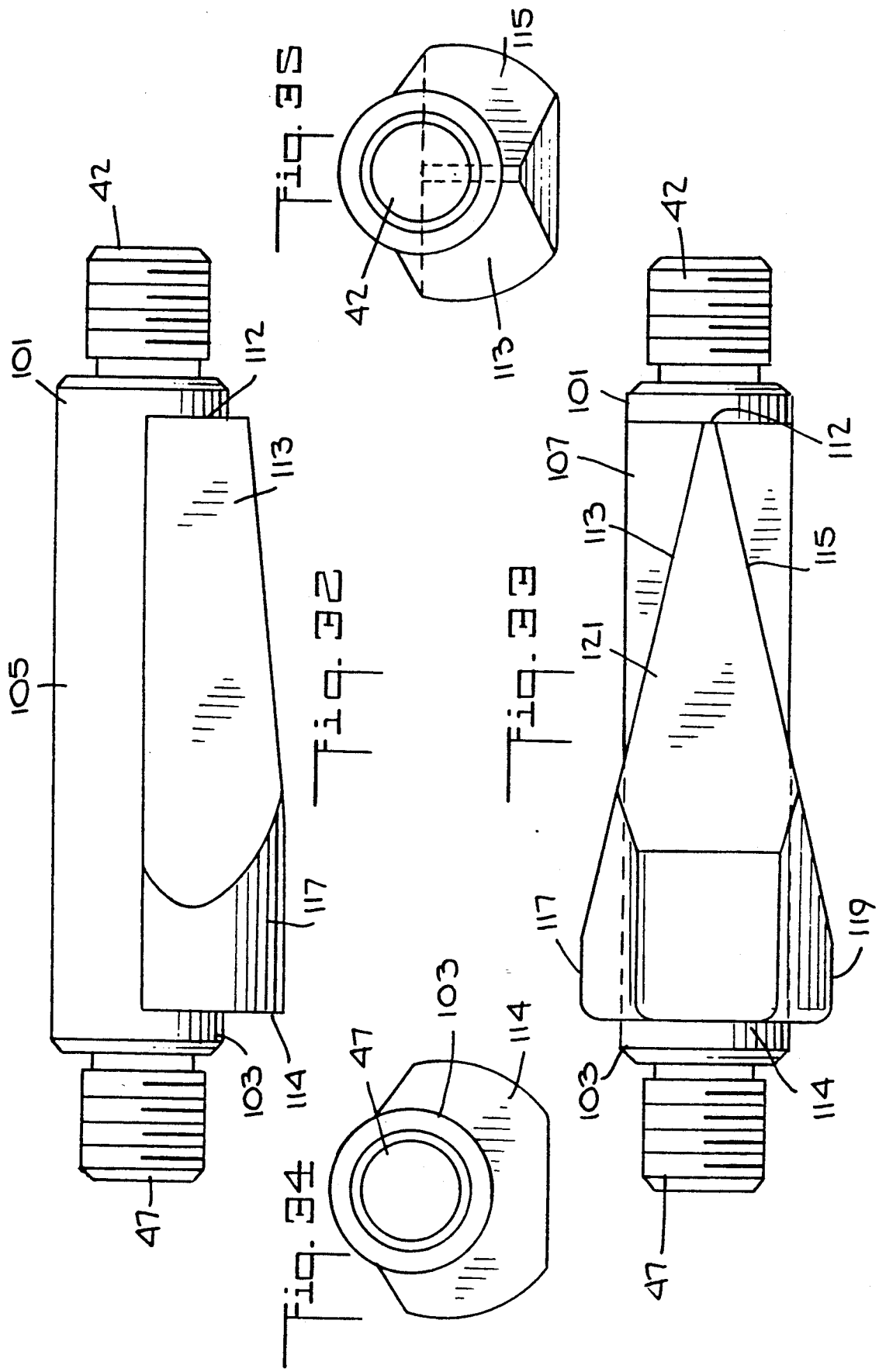

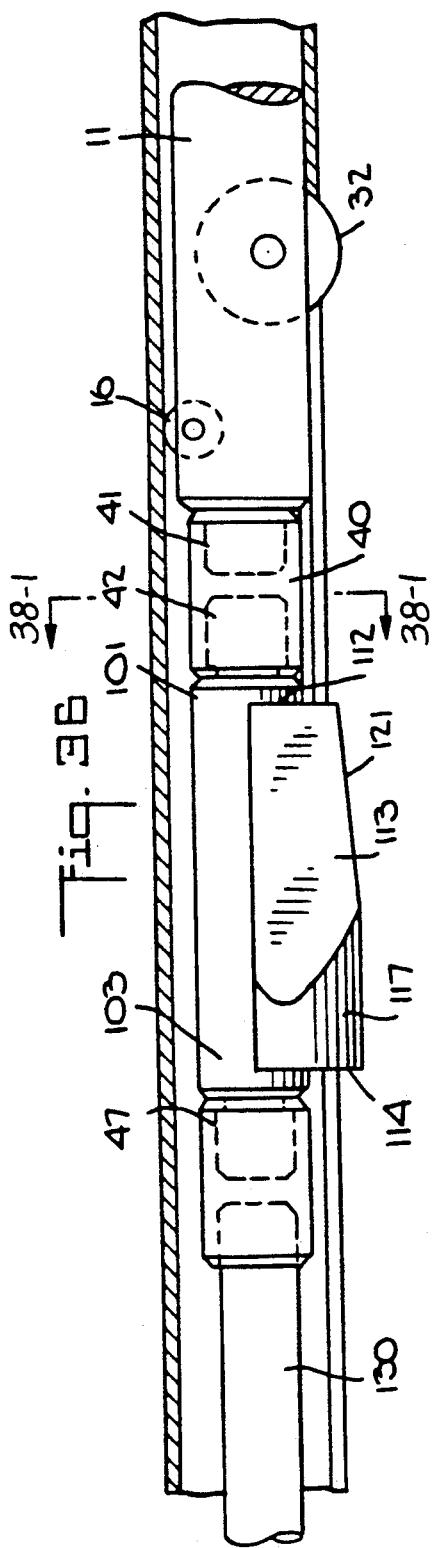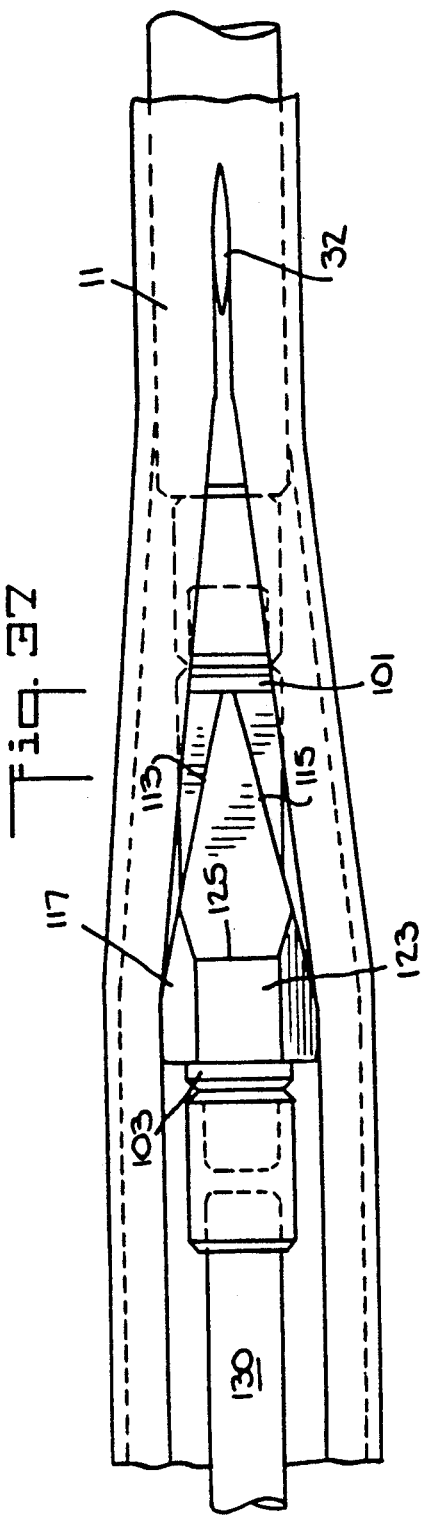

CUTTING/EXPANDING TOOL

CROSS REFERENCE RELATED APPLICATIONS

This application is a continuation-in-part of the application Ser. No. 854,578 filed Mar. 20, 1992 now U.S. Pat. No. 5,171,106 which is a continuation-in-part of the application Ser. No. 636,258 filed Dec. 31, 1990 now U.S. Pat. No. 5,098,225.

BACKGROUND OF THE INVENTION

1. Field of the Invention

The present invention relates to a cutting/expanding tool that permits the in-place replacement of an existing main by inserting the cutting/expanding tool into the main so as to cut the main and expand it, thereby permitting a replacement main to be drawn through the existing main.

2. Description of the Related Art

When it becomes necessary to replace an existing main, for example a gas service main and particularly a buried gas main, it is often desirable to leave the existing main in place and to use is as a guide for the replacement main. In the particular case of a buried main, the location of the main, for example under a sidewalk or a street, often makes excavation costs prohibitive. Moreover, even if excavation is undertaken, the cost to restore the surface of the ground, for example by repaving, often contributes substantially to the overall cost of repairing the main.

Various techniques have therefore been proposed to permit the replacement on an existing main without the need for excavating the entire length of the main or otherwise disturbing the surface of the ground. According to these techniques, the ground at two ends of the existing main is excavated to expose those ends. A tool is inserted into the buried main to cut and to expand the main in place. A replacement main is drawn through the expanded main, leaving the old main in place in the ground.

U.S. Pat. No. 3,181,302 to Lindsay shows such a tool. As shown in FIGS. 9 through 11 therein, the tool includes a pipe cutter that pulls a spreader assembly. The pipe cutter is formed by two half cylinders which are retained in spaced relationship and which support a plurality of cutter disks. The disks alternately project upwardly and downwardly from the surface of the cylinder halves. With this structure, as the pipe cutter is drawn through an existing main, it progressively cuts the main in half whereupon the spreader assembly spreads the halves to permit a replacement main to be drawn back through the existing main's halves.

A disadvantage of the cutter/expander tool shown by Lindsay is that it is prone to rotational motion which causes unpredictability in the cut. The rotational motion is so large that Lindsay provides a rotating bearing to accommodate the motion. Moreover, the Lindsay tool cuts the existing main into two halves, and separates the two halves with its spreader. With no support at the separation between the halves, the soil surrounding the existing main easily falls into the cavity left by the cutter/expander tool. This soil blocks efforts to insert a replacement main into the existing main.

It has also been considered to use a cutter/expander tool in the form illustrated in FIG. 26. As shown there, the tool includes an expander bulb 1 in the form of an eccentric, generally conical bulb. On the expanding side 2, a shearing blade 4 is mounted through suitable means such as bolts 5. The shearing blade 4 is located at a diameter on the eccentric expander bulb which corresponds to the diameter of existing main 11. Means 6 are provided on the expander to push or pull (not shown) the tool through the main 11.

Use of the cutter/expander of FIG. 26 has not been found to be satisfactory. First, like the cutter/expander of Lindsay, it is not possible to control rotation of the tool. Thus, even though the FIG. 26 tool is inserted into the main with shearing blade 4 down, it may eventually rotate to a shearing blade-up position, thereby allowing surrounding soil to fall into the existing main and block the insertion of a replacement main. Second, the force required to overcome friction and to create a cutting force while propelling the tool through the existing main is so great as to force the existing main out of the ground. Usually, the existing main is forced out of the ground into the excavation ditch at the exit end of the tool. Sometimes, however, when the tool binds within the existing main, the existing main buckles up through the ground at its midpoint, thereby defeating the entire purpose of using the tool.

Finally, the tool of FIG. 26 is ill-equipped to cut through many different couplings and repair points often found on existing mains. As shown, for example, in FIG. 1, main 11 can include a significant number of couplings and joints along its length. For example, a stainless steel repair sleeve 120 may have been bolted around the main to repair a leak in the main. The main may also include a strap-on T coupling 14 which permits services 15 to be added at any point along the main. Additionally, to connect separate lengths of main together, threaded couplings 17 or compression couplings 19, may have been used. Such couplings present problems to conventional cutting/expanding tools.

SUMMARY OF THE INVENTION

It is an object of the present invention to overcome the disadvantages found in conventional cutting/expanding tools.

It is a further object of the present invention to provide a cutting/expanding tool which reduces the propensity of the tool to rotate within the existing main.

It is a further object of the present invention to provide a cutting/expanding tool which is capable of cutting through various couplings and other paraphernalia associated with existing mains.

It is a further object of the present invention to provide a cutting/expanding tool which is capable of cutting an existing main and expanding it in place in such a way that the forms a roofed tunnel which prevents surrounding soil from falling into the main and thereby facilitates the insertion of a replacement main.

It is a further object of the present invention to provide a cutting/expanding tool which operates so as to reduce the force which is necessary to propel the tool through the existing main, thereby to ensure that the main remains in place during the cutting/expanding process.

In one aspect of the invention, these objects are achieved through the provision of a cutting/expanding tool having a support body with a guide side and a cutting side, an expander connected rearwardly of the support body, a pair of tandem guide rollers mounted for rotational movement on the guide side, and a cutting wheel mounted for rotational motion on the cutting side. A scoring wheel may be mounted forwardly of the cutting wheel to score the inner surface of the existing main prior to cutting by the cutting wheel, thereby to ease the cutting process. The rearwardly-connected expander may be shaped in a generally eccentric frustro-conical form with the eccentric expanding portions projecting toward the cutting side.

In another aspect of the invention, these objects are achieved by the provision of a splitting/expanding method that includes the steps of guiding a cutting/expanding tool through a main, the cutting/expanding tool having a pair of tandem guide rollers and at least one cutting wheel opposed to the guide rollers, scoring the inner surface of the main with the guide rollers whereby the guide rollers track through the main preventing substantial rotation of the tool, cutting the main with the cutting wheel, and expanding the main along the scoring. Preferably, the main is replaced by drawing a replacement main through the expanded main, the replacement being connected rearwardly of a second, generally frustro-conical expander whose largest diameter is larger than the diameter through which the existing main has already been expanded in the expanding step.

This brief summary of the invention has been provided so that the nature of the invention may be understood quickly. A more complete understanding of the invention may be obtained by reference to the following detailed description of the preferred embodiment and the accompanying drawings, which together form a complete part of this specification.

BRIEF DESCRIPTION OF THE DRAWINGS

FIG. 1 is a perspective view of an existing main;

FIG. 2 is an elevational view of an embodiment of the present invention;

FIG. 3 is a top plan view of the FIG. 2 embodiment;

FIG. 6 through 12 are sectional views taken along the lines 6—6 through 12—12 in FIG. 5;

FIG. 14 is a view for explaining the expanding process by the expander;

FIG. 15 through 18 are views for explaining coupling to a second expander used for drawing a replacement main back through the existing main;

FIG. 19 is a view for explaining the attachment of the replacement main to the second expander;

FIGS. 20 through 25 are views for explaining the insertion of the replacement main into the existing main;

FIG. 31 is a perspective view of a pie shape expander that may be used in the present embodiment;

FIG. 32 is a side view of the pie shape expander of FIG. 31;

FIG. 33 is bottom view of the pie shape expander of FIG. 31;

FIG. 34 is a rear view of the pie shape expander of FIG. 31;

FIG. 35 is a front view of the pie shape expander of FIG. 31;

FIG. 36 is a side view of the cutting/expanding tool with the pie shape expander in a main;

FIG. 37 is a bottom view of the cutting/expanding tool with the pie shape expander of FIG. 31 in a main; and FIG. 38 is a cross-sectional view along lines 361 of FIG. 36.

DESCRIPTION OF THE PREFERRED EMBODIMENT

Figure 4:
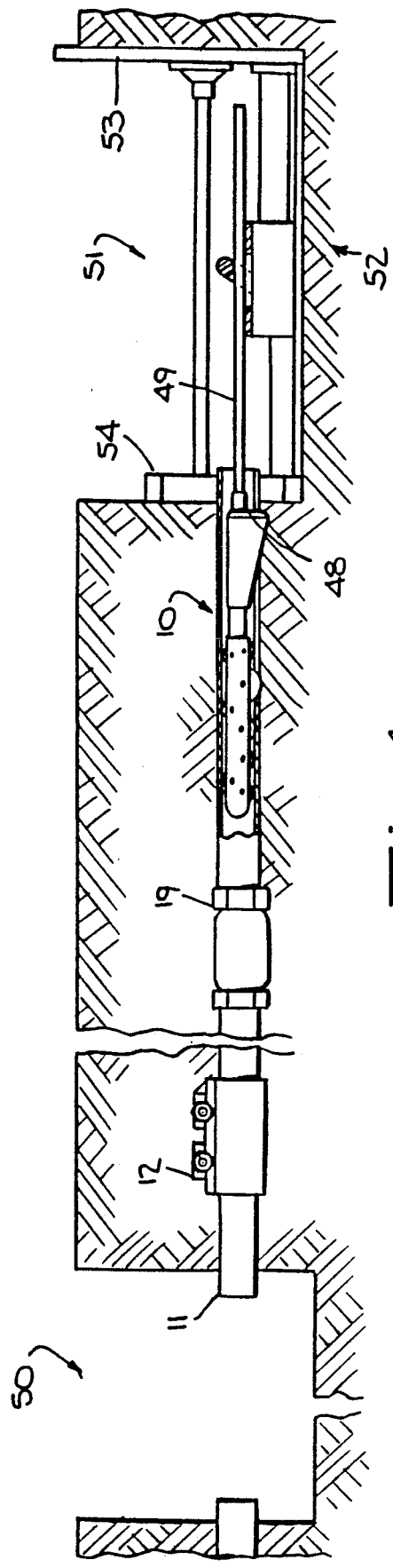
FIG. 4 is a diagrammatic plan view of the FIG. 2 embodiment being used to cut and expand an existing main.

As shown in FIG. 2, the cutting/expanding tool includes an elongated, generally rod-like support member 11. A screw-eye 12 is bolted to the forward end of the support rod to provide means for dragging the tool through an existing main. A threaded coupling 14 is provided at the rear end of the support rod to permit coupling to expander 15 as will be described below.

The outer diameter of the support rod 11 is chosen in consideration of the inner diameter of the existing main. That is, the outer diameter of the support rod should be slightly smaller than the inner diameter of the existing main. This permits clearance between the two and accommodates variations in the inner diameter of the main caused, for example, by corrosion, minor bends, etc.

The length of the support rod 11 is chosen in consideration of the room needed to mount the assemblies described below, and further in consideration of the leverage needed by expander 15 to expand the cut main. That is, the distance between the most rearward cutting wheel 32 and expander 15 should be sufficient to allow expander 15 to expand the cut main with a gradual pitch rather than requiring the expander to expand the cut main with a steep pitch.

A series of generally rectangular cutouts or wells 17 are provided along the upper or guide surface of the support rod 11. In each cutout, a guide roller 16 is journalled on axis 19 for rotational movement within the wells 17. As shown in FIG. 3, the guide rollers are spaced one behind the other in tandem relationship along the longitudinal axis of support rod 11.

A channel 20 is cut at the base of each of wells 17. The channel prevents any debris which falls into the well from interfering with the rotation of guide rollers 16. That is, debris falling into the well will, for the most part, also fall through channel 20.

A series of wells are also cut into support rod 11 on the surface of the rod that is opposed to the guide surface. This surface will hereinafter be called the cutting surface. As shown in FIG. 2, each of the wells with the exception of the last is progressively larger from the forward end of the support rod and extending rearwardly thereof, and each accommodates a progressively larger wheel. In particular, the forward end of support rod 11 includes a first well 21 having a scoring wheel 22 journalled for rotational motion around axle 24. The diameter of scoring wheel 22 is selected so that it protrudes from the cutting surface of support rod 11 by a distance which is not sufficient to cut completely through the existing main. That is, scoring wheel 22 is designed simply to score the inner surface of the existing main and to facilitate later cutting by the remaining cutting wheels.

A first cutter wheel 25 is journalled for rotational movement around axle 27 within well 26. The cutter wheel 25 and well 26 are arranged rearwardly of scoring wheel 22. Preferably, first cutter wheel 25 is also mounted rearwardly of the forward most guide roller 16 and forwardly of the second, although this is not essential.

The diameter of first cutter wheel 25 is selected so that it cuts completely through the wall of the existing main. In particular, as shown in FIG. 2, the diameter of first cutter 25 is larger than that of scoring wheel 22.

A second cutter wheel 29 is mounted rearwardly of the first cutter wheel in a similar arrangement around shaft 30 and in well 31. As shown, second cutter wheel 29 is of increased diameter with respect to first cutter wheel 25 and facilitates cutting larger diameter fittings, for example, stainless steel repair sleeve 12 (FIG. 1).

Third cutter wheel 32 is arranged rearwardly of second cutter wheel 29 and journalled for rotational movement around axle 34 within well 35. The diameter of third cutter wheel 32 is larger than that of second cutter wheel 29, and permits cutting through even larger diameter pieces, such as couplers 17 and 19 (FIG. 1). In this case, the diameter of the cutter wheel is such that well 35 extends completely through support rod 11. If support rod 11 had been adapted for use with a larger main and its diameter therefore had been larger, this might not have been required.

Preferably, third cutter wheel 32 and its associated well is mounted behind the second forwardmost guide roller 16.

Finally, at the most rearward end of support rod 11, a deburrer in the form of a deburring wheel 36 is mounted for rotational movement around axis 37 in well 39. The deburrer is arranged to remove sharp edges from the cut edge of the main, thereby to ensure that damage to the replacement main is minimized as the replacement main is drawn into the existing main.

At the most rearward end of support rod 11, threaded coupling 14 is screwed into corresponding threaded sleeve 40. Lock screws 41, arranged around the periphery of sleeve 40, prevent loosening of this connection.

A threaded coupling 42, mounted at the most forward end of expander 15, is also inserted into sleeve 40, and is held in place there by corresponding lock screws 43.

As shown in FIGS. 2 and 3, expander 15 is a generally solid mass having an eccentric frustro-conical shape. The top edge of the expander, corresponding to the guide surface of support rod 11, extends substantially straight back to the rearward edge of the expander. Accordingly, when inserted into a main, this surface simply bears against the inner surface of the main.

On the other hand, the lower surface 44 of the expander, corresponding to the cutting surface of rod 11, is inclined downward and is adapted to expand the cut main along its cut edge.

The most rearward portion of the expander 15 is provided with a threaded coupling 47 which is adapted to receive means for propelling the cutting/expanding tool 10 through the main.

Figure 27:
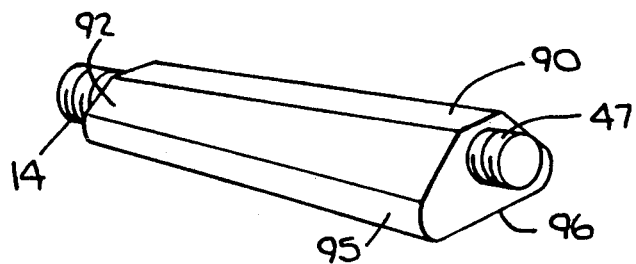
FIG. 27 is a perspective view of a wedge shape expander that may be used in the present embodiment.
Figure 28:
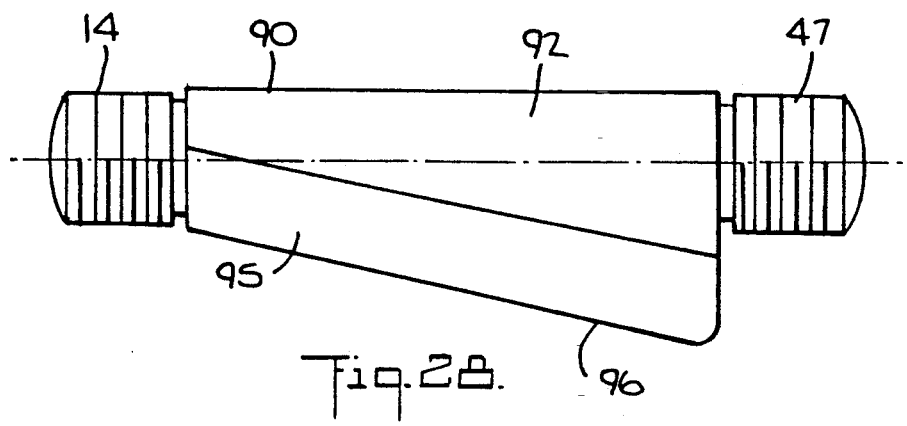
FIG. 28 is a side view of the generally wedge shape expander of FIG. 27.
Figure 29:
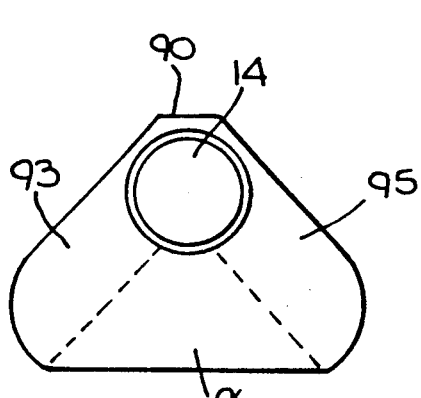
FIG. 29 is a front view of the generally wedge shape expander of FIG. 27.

Expander 15 has a generally conical shape but a generally wedge shape expander shown in FIGS. 27, 28 and 29 may also be used to perform the expanding function. Referring to FIG. 27, a top portion of the generally wedge shape expander has a flat surface 90 that is parallel to the interior of the main opposite the cut at a distance therefrom. The wedge shape expander has a bottom portion with a flat surface 96. As best seen in FIG. 29, the flat bottom face 96 is narrower than the diameter of the main at the front which is connected to the threaded coupling 14 and wider than the main at the rear which is connected to the threaded coupling 47. A flat surface 92 extends downward and outward from the flat top surface 90 and meets a cylindrical section 95. Similarly a downward and outward extending flat portion (not shown) extends from top portion 90 and meets a cylindrical portion 93. The cylindrical portions 93 and 95 of the wedge shaped expander meet the flat bottom portion 96. As best seen in FIG. 28, the bottom surface 96 is angled downward from the narrow part thereof at the front threaded coupling 14 to the wide part thereof at the rear threaded coupling 47. While the wedge shaped expander shown in FIGS. 27, 28 and 29 incorporates a flat bottom surface, it is to be understood that other wedge shapes may also be used. For example, a wedge in the form of a pyramid having a corner at the cut along the main with a base wider than the diameter of the main can also serve as an expander.

Figure 30:
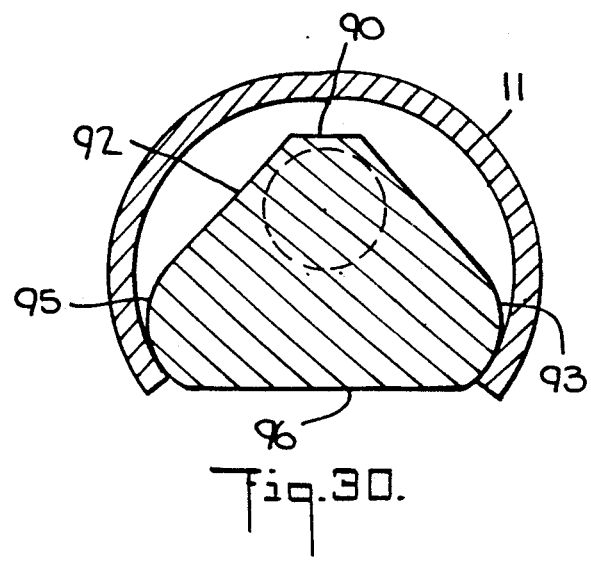
FIG. 30 is a rear view of the wedge shape expander in a cut main illustrating the expansion of the main.

The wedge shaped expander of FIGS. 27, 28 and 29 operates to expand the cut main in a manner substantially similar to the conical shaped expander. FIG. 30 illustrates the operation of the wedge shape expander in a main. As shown in FIG. 30, the space in the interior of the main between the interior wall of the main and the flat top face 90 and the outward and downward portions extending from the top portion 90 to cylindrical portions 93 and 95 allows debris to travel through the interior of the main and fall out behind the expander. Only the cylindrical portions 93 and 95 contact the interior wall of the main. As a result, the area of the wedge shaped expander in contact with the main is minimized and the frictional forces between the wedge shaped expander and the main are significantly reduced.

An expander 100 that has a pie shaped section adapted to expand a main along a cut line therein such as shown in FIGS. 31, 32, 33, 34 and 35 may also be used. Referring to FIG. 31, a section of the expander 100 therein has a front cylindrical portion 101 to which the threaded coupling 42 is joined, a rearward cylindrical portion 103 to which the coupling 47 is joined and a part cylindrical portion between cylindrical portions 101 and 103 with a cylindrical shaped surface 105 and a flat surface 107 opposing the cylindrical shaped surface 105.

A generally pie shaped section of the expander 100 shown in FIGS. 31, 32, 33, 34 and 35 has a surface joined to the flat surface 105, a narrow end 112 joined to the cylindrical portion 101 and a wide end 114 joined to the cylindrical portion 103. A flat side surface 113 of the pie shaped section and a corresponding flat side surface 115 best shown in FIG. 33 extend rearward from the narrow end 112. A cylindrically shaped side surface 117 extends forward from the wide end 114 to meet the flat side surface 113 and a corresponding cylindrical shaped side surface 119 extends forward from the wide end 114 to meet the flat side surface 115. A flat trapezoidal shaped surface 121 extends rearward from the narrow end 112 and a flat rectangular shaped surface 123 extends forward from the wide end 114 to meet the flat trapezoidal surface 121 at an intersection 125.

FIG. 36 shows a side view of an assembly of the pie shaped expander 100 of FIGS. 31, 32, 33, 34 and 35 coupled to the cutter support rod 11 in a main and FIG.

38 shows a cross-section of FIG. 36 along lines 38-1. Referring to FIG. 36, the front end coupler 42 of the expander 100 is threadedly coupled to the rear coupler 14 of the support rod, 11 and the rear end coupler 47 is coupled to a rod 130 that may be used to exert forward force on the expander 100 and the support rod 11. The cylindrical surface 105 and cylindrical end portions 101 and 103 are within and do not touch the interior wall of the main. The bottom surfaces 121 and 123 of the pie shaped section of the expander extend below the main from the front end 112 to the rear end 114.

Referring to the cross-sectional view of FIG. 38, the diameter of cylindrical portion 101 is smaller than that of the main so that the cylindrical portions 101, 103 and cylindrical surface 105 are out of contact with the interior wall of the main at a distance therefrom. The front end 112 which extends below the wall of the main is aligned with the line of cut and initially guides the expander 100 into the main. The main is then expanded along the line of cut by side surfaces 113 and 115 until contact is made with cylindrical side surfaces 117 and 119. Thereafter, the cut main contacts only cylindrical side surfaces 117 and 119 as shown in the bottom view of FIG. 37 and the cross-section view of FIG. 38. The cylindrical surfaces 117 and 119 burnish the separated walls of the main to provide a smooth surface for later insertion of a replacement pipe therein.

Each of the foregoing parts is preferably made of material harder than the material that it is adapted to cut and to expand. In the preferred embodiment, the support rod 11 and each of the guide, scoring, deburring and cutter wheels are steel, case hardened to between Rockwell C55 and C60.

Figure 5:
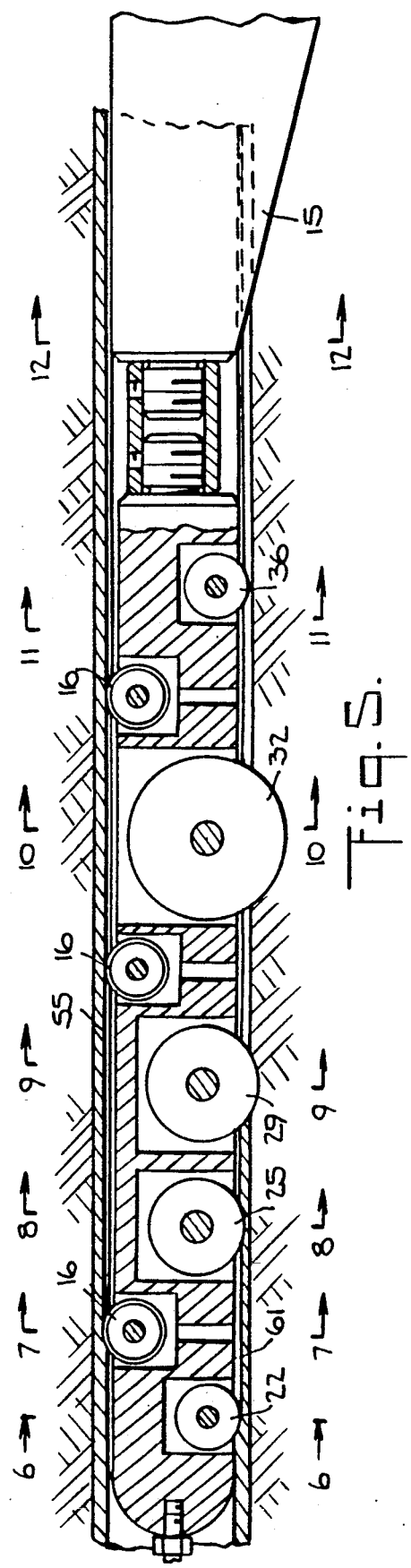
FIG. 5 is an expanded, cross sectional view of the view in FIG. 4.

FIGS. 4 and 5 show the cutting/expanding tool 10 in use in an existing main. As shown in FIG. 4, excavations 50 and 51 have been made at respective ends of main 11. A hydraulic propulsion unit designated generally at 52 is erected within excavation 51 and is provided with, among other things, support plates 53 and 54 against which the hydraulic propulsion unit presses. As shown in FIG. 4, sleeve 48 (similar in construction to sleeve 40) couples cutting/expanding tool 10 to a rod 49 which extends back to excavation 51 and which is propelled by hydraulic propulsion unit 52.

While FIG. 4 shows that the cutting/expanding tool is pushed through main 11, it is also possible to pull the cutting/expanding tool by means of screw eye 12. Pulling the cutting/expanding tool is advantageous in that it permits the tool to be used in connection with mains which have small radius turns. On the other hand, pushing the tool is advantageous in the event that gas main 11 moves during the cutting/expanding process into excavation 50. In that event, the exposed portion of the main would interfere with pulling the tool through the main, and it would be necessary to stop the cutting/expanding process temporarily remove the newly-exposed portion of main 11. On the other hand, if the tool were pushed through the main, the newly-exposed portion of the main would not interfere at all.

FIG. 5 is an expanded view of the cutting process. As shown there, each of the wheels is configured to perform certain specific functions; these configurations are shown in detail in the cross-sectional views of FIGS. 6 through 13a and 13b.

The guide rollers are shown in the cross section of FIG. 7. As shown there, the first guide roller is configured not to cut through the main, but only to form a groove 55 in the inner, upper surface of the main. Trailing guide rollers will track in groove 55 as shown in FIG. 5, and in conjunction with the tandem arrangement of the guide rollers will prevent the tool from rotating within the main.

To achieve this, each of the guide rollers 16 is formed with a broad peak 56. Because of this broad peak, the guide roller is not able to cut through the main, and only forms groove 55 as shown in FIG. 5.

Figure 13A:
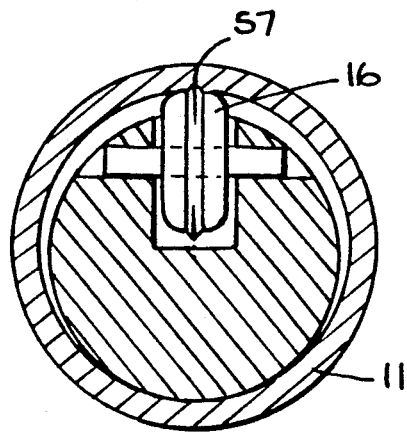
FIG. 13a is a modification of the FIG. 7 view showing, a first alternative guide roller.

If desired, one or more of the guide rollers may be formed with a cusp 57 as shown in FIG. 13a. The cusp 57 permits the guide rollers to track more faithfully in groove 55, and improves the non-rotational stability of the tool. In this regard, it may be desirable to use the guide roller configurations shown in FIGS. 7 and 13 in combination. For example, the forwardmost guide roller 16 might be configured as shown in FIG. 7 initially to form groove 55; the trailing guide rollers could then be formed as shown in FIG. 13a to assist these latter guide rollers to track in groove 55.

Figure 13B:
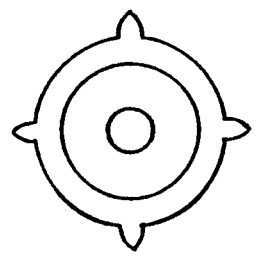
FIG. 13b shows a second alternative guide roller.

If desired, one of the guide rollers can also include perforating spokes to form perforations in the guide groove, thereby to permit any residual natural gas or other gaseous ground contents that might be trapped in the cut main to escape rather than being stored inside the cut main. A suitable perforating guide roller is shown in FIG. 13b.

FIG. 6 is a cross section of scoring wheel 22. As shown there, the scoring wheel includes a cutting edge 60 which enables the scoring wheel to form a score 61 as shown in FIG. 5. As described above, however, the diameter of the scoring wheel 22 is selected so that score 61 does not extend completely through main 11, but only facilitates later cutting by wheels 25, 29 and 32.

FIG. 8 is a cross-sectional view of cutter wheel 25. As shown in FIG. 8, cutter wheel 25 includes cutting edge 62 and is of sufficient diameter to cut completely through main 11.

FIG. 9 is a cross-sectional view of cutter wheel 29. As shown in FIG. 9, cutter wheel 29 includes cutter edge 64 and is of a diameter sufficient to extend not only through main 11 but also through additional paraphernalia normally found in connection with main 11, such as repair sleeve 12.

FIG. 10 is a cross-sectional view of cutter wheel 32. As shown in FIG. 10, cutter wheel 32 includes cutter edge 65 and is of a diameter sufficient not only to cut through main 11 but also to cut through even larger diameter paraphernalia found in connection with main 11, such as coupling 19.

FIG. 11 is a cross-sectional view of deburring wheel 36. As shown in FIG. 11, the deburring wheel includes a projection 66 which is adapted to ride in the cut 68 in main 11 and to smooth the edges 67 of that cut. This smooths the inner edge of the cut, the edge along which the replacement main will be drawn, and minimizes damage to the replacement main.

FIG. 14 shows a perspective view of the expander 15 as it expands the cut main 11. As shown there, expanding surface 44 of expander 15 forces the cut main downwardly and outwardly. Because of the distance between final cutting wheel 32 and expander 15, the main is forced outwardly and downwardly with a gradual pitch, thereby lessening the force required to expand the main. As shown in cross section in FIG. 12, during the expanding, the main is also hinged around groove 55 that was formed by guide rollers 16. This hinging action also lessens the force required by the expander to expand main 11.

Because the cutting wheels are located on the lower, cutting surface of support rod 11, and because the tandem guide rollers track to prevent substantial rotation of the tool, the main is cut at bottom thereof. After the expander expands the main, the main acts as a roof to prevent soil from falling into the tunnel left by the cutting/expanding tool. Because of this roofed tunnel, surrounding soil does not fall and block or otherwise impede replacement of the main with replacement main.

Returning to FIG. 4, hydraulic propulsion unit 52 propels cutter 10 through main 11 until it reaches excavation 50. At that point, tool 10 is removed from the end of the propulsion rod in preparation for drawing the replacement back through the roofed tunnel formed by the existing main.

FIGS. 15 through 18 are views for explaining this. As shown in FIG. 18, a coupler assembly 70 is formed from a solid coupler 71 and a shaft 73 threaded at the end thereof. The coupler 71 is beveled at its exposed end and includes a pair of through-holes 74 offset perpendicularly from one another. Threaded shaft 73 is adapted to be inserted through hole 72 in second expander 75. The second expander is shaped in a generally frustro-conical form with the aforementioned hole 72 extending therethrough and with a recessed portion 76 whose inner diameter is designed to accommodate the outer diameter of the replacement main.

The length of shaft 73 is selected so that when shoulder 73a of the coupler assembly bears against the base 76a of recess 76, the threaded portion extends out of second expander 75 sufficiently to be engaged with coupler sleeve 48. Coupler sleeve 48 is similar to coupler sleeve 40 and is provided with pairs of lock bolts around the periphery thereof. The threaded rod 73 and coupler sleeve 48 are threaded together and the lock bolts are set.

FIG. 15 to 17 are views for explaining the preparation of replacement main 80 for connection to coupler assembly 70. As shown in FIG. 15, threaded shaft 73 is inserted into die 48. The die is provided with two pairs of throughgoing holes patterned the same as throughgoing holes 74 on coupler 70. Additionally, die 48 is provided with a pair of spaced, mutually perpendicular lock bolts and associated threaded holes.

As shown in FIG. 16, shaft 73 is inserted into die 48 and the lock bolts are tightened. By drilling through both pairs of throughgoing holes, the shaft 73 is provided with two pairs of throughgoing holes 81 that correspond to holes 74 in coupler 70, as shown in FIG. 17. As shown in FIG. 19, replacement main 80 is then slipped over coupler 71, and bolts 83 are inserted through the through-holes to secure the replacement main in place (FIG. 22).

As shown in FIGS. 20 and 21, the replacement main is then drawn back through the roofed tunnel provided by the previously cut and expanded existing main. Specifically, as shown in detail in FIG. 22, the second expander ensures that there is sufficient clearance for the replacement main to be drawn through the roofed tunnel without obstruction. The second expander may be the conical expander 15 of FIGS. 2 and 3, the generally wedge shape expander of FIG. 27 or the pie shape expander of FIG. 31. In particular, as shown in cross section in FIG. 23, existing main 11 is spread by the conical second spreader 75 to the extent that replacement main 80 is easily drawn therethrough. The spreading may be done by the generally wedge shape expander or the pie shape expander as shown in FIGS. 30 and 38.

In FIGS. 19 through 23, the process of drawing the replacement main back through the existing main has been shown as if it were conducted by pulling on hydraulic pusher rod 49. This, of course, is not essential. As shown in FIG. 24, it is also possible to feed a cable through the existing main and to secure a screw eye assembly to coupler sleeve 48, thereby to draw the replacement main back through the existing main 11 with the cable.

FIG. 25 shows the replacement main in place within the existing main. At this point, additional excavations can be made, if necessary, to provide service access, for example, the access shown at 14 in FIG. 1.

Figure 26:
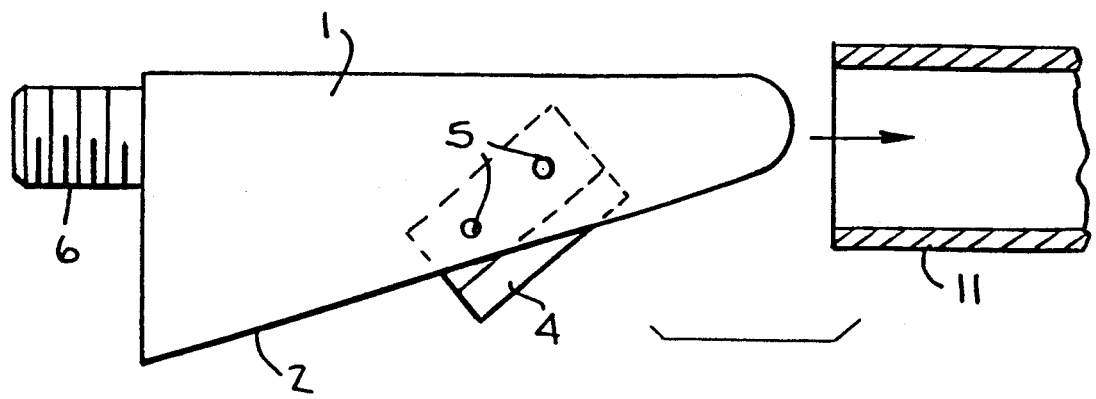
FIG. 26 is a view showing an unsatisfactory cutting-/expanding tool.

Those skilled in the art will recognize that modifications to the foregoing embodiment may be made without departing from the spirit of the present invention. Under certain cutting circumstances, for example, it may be possible to dispense with cutting blade 4 and to provide the FIG. 26 tool with appropriate tandem guide rollers and cutter wheels. Accordingly, the foregoing description should not be construed as limiting the scope of the invention, which instead should be measured by reference to the following claims.

What is claimed is:

1. A tool for cutting and expanding a main, comprising:
    a cylindrical support body having an upper side and an opposed lower cutting side including cutting means, the main being cut by said cutting means along a line on the cutting side; and
    an expanding device rearward of the support body having a first end coupled to said support body and a second end rearward of the first end, said expanding device including:
    a top section facing a side of the main on the upper side of the support body; and
    a pie shaped bottom section narrower than the diameter of the main at the first end and wider than the diameter of the main at the second end having a lower surface extending through the line cut in the main on the cutting side from the first end to the second end
    wherein the top section of the expanding device has a cylindrical surface out of contact with and facing the portion of the main on the upper side of the support body; and
    wherein the top section of the expanding device has a flat lower surface portion parallel to the longitudinal axis of the support body, an upper surface of the pie shaped section being joined to the flat lower surface of the top section.

2. A tool for cutting and expanding a main, comprising:
    a cylindrical support body having an upper side and an opposed lower cutting side including cutting means, the main being cut by said cutting means along a line on the cutting side; and
    an expanding device rearward of the support body having a first end coupled to said support body and a second end rearward of the first end, said expanding device including:
    a top section facing a side of the main on the upper side of the support body; and
    a pie shaped bottom section narrower than the diameter of the main at the first end and wider than the diameter of the main at the second end having a lower surface extending through the line cut in the main on the cutting side from the first end to the second end; and wherein a lower surface of the pie shaped bottom section on the expanding device includes a flat trapezoidal portion that extends downward and outward from the narrower first end.

3. A tool for cutting and expanding a main, comprising:

a cylindrical support body having an upper side and an opposed lower cutting side including cutting means, the main being cut by said cutting means along a line on the cutting side; and an expanding device rearward of the support body having a first end coupled to said support body and a second end rearward of the first end, said expanding device including:

a top section facing a side of the main on the upper side of the support body; and a pie shaped bottom section narrower than the diameter of the main at the first end and wider than the diameter of the main at the second end having a lower surface extending through the line cut in the main on the cutting side from the first end to the second end;

wherein a lower surface of the pie shaped bottom section on the expanding device includes a flat trapezoidal portion that extends downward and outward from the narrower first end; and wherein side surfaces of the pie shaped bottom section of the expanding device each comprises a flat section extending rearward from the first end and a cylindrical section in contact with the main extending forward from the second end.

4. A tool for cutting and expanding a main, comprising:

a cylindrical support body having a guide side and an opposed cutting side;

a first guide roller including surface means to form a guide groove mounted along a longitudinal axis of the support body on the guide side of the support body;

a second guide roller mounted in tandem with the first guide roller along the longitudinal axis of the support body on the guide side of the support body including surface means for tracking the formed guide groove;

a cutter mounted between said first and second guide rollers on the cutting side of the support body; and an expanding device rearward of the support body having a first end coupled to said support body and a second end rearward of the first end, said expanding device including:

a top section facing a portion of the main on the guide side of the support body; and a pie shaped bottom section narrower than the diameter of the main at the first end and wider than the diameter of the main at the second end having a lower surface extending through a line cut in the main on the cutting side by the cutter from the first end to the second end.

5. A tool according to claim 4 wherein the top section of the expanding device has a cylindrical surface out of contact with and facing the portion of the main on the guide side of the support body.

6. A tool according to claim 5, wherein the top section of the expanding device has a flat lower surface portion parallel to the longitudinal axis of the support body, an upper surface of the pie shaped section being joined to the flat lower surface of the top section.

7. A tool according to claim 4, wherein a lower surface of the pie shaped bottom section of the expanding device includes a flat trapezoidal portion that extends downward and outward from the narrower first end.

8. A tool according to claim 4, wherein side surfaces of the pie shaped bottom section of the expanding device each comprises a flat section extending rearward from the first end and a cylindrical section in contact with the main extending forward from the second end.

* * * * *

UNITED STATES PATENT AND TRADEMARK OFFICE
CERTIFICATE OF CORRECTION

PATENT NO. : 5,306,101
DATED : April 26, 1994
INVENTOR(S) : GERALD ROCKOWER, ET AL.

It is certified that error appears in the above-identified patent and that said Letters Patent is hereby corrected as shown below:

ON THE TITLE PAGE

At [75] Inventors, "Scotch Plaines" should read --Scotch Plains--.

COLUMN 2

Line 53, "the forms" should read --it forms--.

COLUMN 3

Line 41, "cross sectional" should read --cross-sectional--.
    Line 46, "ing," should read --ing--.

COLUMN 4

Line 14, "lines 361" should read --lines 38-1--.

COLUMN 5

Line 7, "forward most" should read --forwardmost--.
    Line 19, "sleeve 12" should read --sleeve 120--.
    Line 24, "di7" should read --di- --.

COLUMN 7

Line 4, "rod, 11" should read --rod 11--.
    Line 56, "remove" should read --to remove--.

UNITED STATES PATENT AND TRADEMARK OFFICE
CERTIFICATE OF CORRECTION

PATENT NO. : 5,306,101
DATED : April 26, 1994
INVENTOR(S) : GERALD ROCKOWER, ET AL.

It is certified that error appears in the above-identified patent and that said Letters Patent is hereby corrected as shown below:

COLUMN 9

Line 34, "rod 73" should read --shaft 73--.

COLUMN 10

Line 44, "end" should read --end,--.

COLUMN 12

Line 22, "claim 4" should read --claim 4,--.

Signed and Sealed this

Fourth Day of April, 1995

Attest:

BRUCE LEHMAN

Attesting Officer    Commissioner of Patents and Trademarks